(12) United States Patent
Figueroa-Rivera

(10) Patent No.: US 6,484,923 B2
(45) Date of Patent: Nov. 26, 2002

(54) HAND HELD FLUX AND SOLDER FEEDING TOOL

(76) Inventor: Miguel Figueroa-Rivera, 144 Carazo, Guaynabo, PR (US) 00969

( * ) Notice: Subject to any disclaimer, the term of this patent is extended or adjusted under 35 U.S.C. 154(b) by 0 days.

(21) Appl. No.: 09/794,264

(22) Filed: Feb. 27, 2001

(65) Prior Publication Data

US 2002/0117536 A1 Aug. 29, 2002

(51) Int. Cl.[7] .............................................. B23K 1/002
(52) U.S. Cl. ............................................ 228/33; 228/51
(58) Field of Search ............................. 228/51–53, 18, 228/33, 36, 214, 245, 250; 219/229–231, 233, 236–239

(56) References Cited

U.S. PATENT DOCUMENTS

| | | | | |
|---|---|---|---|---|
| 3,393,856 A | * | 7/1968 | Fortune | |
| 4,526,532 A | * | 7/1985 | Nelson | |
| 4,666,398 A | * | 5/1987 | Kumazawa et al. | |
| 5,088,649 A | | 7/1990 | Hanson et al. | |
| 4,954,076 A | * | 9/1990 | Fioravanti et al. | |
| 5,065,932 A | * | 11/1991 | Hayden et al. | |
| 5,074,455 A | * | 12/1991 | Peana et al. | |
| 5,421,504 A | | 12/1992 | Spirig | |
| 5,492,275 A | * | 2/1996 | Crampton | |
| 5,842,506 A | * | 12/1998 | Peters | |
| 5,945,015 A | * | 8/1999 | Feinler | |

* cited by examiner

Primary Examiner—Tom Dunn
Assistant Examiner—Jonathan Johnson
(74) Attorney, Agent, or Firm—Patent Law Offices of Heath W. Hoglund

(57) ABSTRACT

A flux and solder tool includes a housing configured to store both flux and solder. A nozzle extends from the housing. A pump feeds solder from the housing through the nozzle. A wire drive feeds solder from the housing through the nozzle.

4 Claims, 3 Drawing Sheets

HAND HELD FLUX AND SOLDER FEEDING TOOL

BACKGROUND OF THE INVENTION

There is no better material for a plumber to do a good lasting job in drinkable water lines than copper. There are several materials available in the market to work with water lines, but copper is stronger, relatively cheap, reliable, long lasting, easy to work and safe for your health. I am a plumber by trade and I have worked with a wide variety of materials. In my humble opinion, copper is the best.

To use copper you must solder all joints between connecting pipes. Not long ago the soldering part was the most difficult and time-consuming part. In any copper job to make a good solder, the pipe and the fittings (used to join the connecting pipes) must be clean. You must flux them, heat the fitting and when it is hot enough, feed the solder around the joint.

In the past in order to do all this, you had to bring with you:

1. Sandpaper (to clean fitting and pipe ends);
2. Gas tank with its torch (used to be very heavy);
3. Striker or matches, lighter, or whatever was available to ignite the torch;
4. Flux, and
5. Solder.

Nowadays there are a wide variety of products in the market that will make a brother plumber's work a lot easier, which I call 21$^{st}$ century tools. To start soldering a new job, you must clean both fittings and pipe ends. Sandpaper was not the easiest way, because it had some inconveniences like:

1. It wouldn't work when wet (and you cannot ask us plumbers to keep our tools dry when water is primarily what we work with);
2. It was very difficult for a grown man's finger to fit into a ½ inch diameter fitting with sandpaper to clean it; and
3. It was also very difficult to clean a pipe of fitting when hot.

Today there are stiff wire brushes that can be used to clean the inside and outside of pipes and fittings. These brushes avoid the problems associated with sandpaper.

Then we had the problem of the tank torch and striker;

1. The tank was too big and heavy.
2. The torch had no striker.

Today there are some patented torches supplied Benz-O-Matic that have a built-in striker that will fit into a 1 lb. propane tank. This will make it much more portable and comfortable. These torches are marked with U.S. Pat. Nos. 4,526,532; 4,666,398, and 4,954,076, which I would like to include as part of my detailed description below.

Also, there is a tool from Ridgid that works with electricity. This tool is a torch that will heat the fitting in 16 seconds. They claim it will solder with water in the line something that it couldn't be done with conventional torches, though I have not yet tried it myself.

All these gadgets are very good ideas and they really are 21$^{st}$ century tools. Still, there are some details that we have overlooked. The wire brush and the torch is a great combination, but we still have to do something with the solder and the flux. The inconvenience of fluxing and feeding the solder was that it had to be done manually. The flux is an acid and it is not a pleasant sensation on your hand, body or clothes. If you ask a brother plumber which part he does not like about soldering, many of them will tell you fluxing fittings and pipes.

As far as the solder is concerned, the same thing will happen. To unroll the solder you must put down the torch and use both hands to unroll it. Some times you forget it is hot and might get burned. Some other times just when the fitting is hot, you can find neither flux nor solder, and then you realize that you left them at the previous working spot.

SUMMARY OF THE INVENTION

Thinking of all this, I came up with an idea that will solve these hazards. The concept basically involves fitting the flux and solder in a container that by means of different mechanisms, will feed the flux, solder, or both at the same time and also could be refilled. I believe this idea will benefit many people by making the task easy and safe.

DETAILED DESCRIPTION

The tool is divided into two different compartments: one to fit the solder, and one to fit the flux. The housing is made of a light material such as plastic and water resistant. A nozzle with two different channels, one for the solder and one for the flux, fits into the housing. The flux and solder will be fed to the tip of the nozzle by two different pumping mechanisms. The solder will be fed to the tip by means of a chewing and pulling or pushing mechanism that is hand-activated or could be motor (batteries or electrical) activated totally independent from the other mechanism. The two pump mechanisms work simultaneously with the other.

By fitting the flux and solder in this self-feeding container is a lot easier to be able to flux the fittings and pipes without touching the flux, thus you won't get a harmful acid on your hands, body or clothes. By using the same, since you don't have to touch the solder to unroll it, you won't get burned and you won't have to put down the torch. Also, since both of them are in the same container, it will be easy to find them. The container itself is easy to handle even in awkward positions. In between working areas, the container is carried in a belt holster. Thus, the solder and flux are always ready and at hand.

Figure 1:
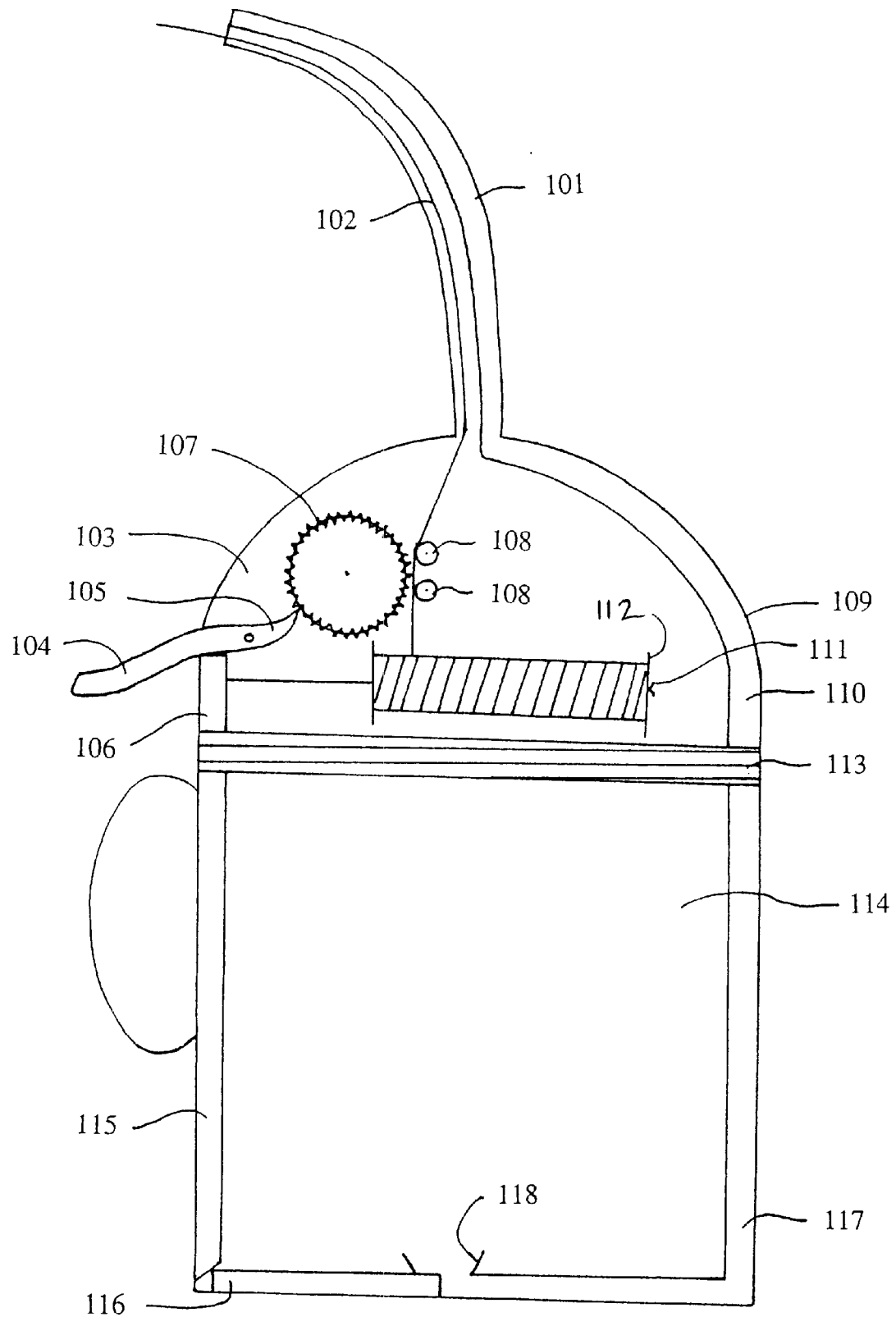
FIG. 1 is a schematic diagram of one preferred flux and solder tool.

Turning to FIG. 1, one preferred embodiment of the flux and solder tool is described. Flux nozzle 101 is a water resistant material that allows the flux to pass through it with a thin squirt. Solder nozzle 102 is able to let the solder go through it. It must be water and heat resistant. Solder trigger mechanism compartment 103 encloses the solder and trigger mechanism. It must be made of a water resistant material, as well as the trigger mechanism parts. It has a hinged door for the replacement of the solder roll.

The trigger 104 is the simplest of many alterations or variations to consider. The one illustrated is hand-activated, however, it could be activated in many other ways, such as air or batteries, but the concept will be the same: a hand held tool that will feed both flux and solder with the push of a button. Solder pushing rod 105 is the means by which the solder pushing pinion will be activated. Flux pushing rod 106 is activated by means of the trigger 104. Solder pushing pinion 107 squeezes the solder against the ball pins 108 and pushes the solder forward. The ball pins 108 will turn to allow the solder to move freely.

Upper housing 109 encases both solder and flux and is made of a light and water resistant material. Flux hose 110 allows the flux to go from the bottom of the housing where the flux is stored all the way to the tip of the nozzle. Solder 112 is a standard roll of solder. Solder roll security pin 111 holds the solder to the moving base. It allows different sizes of rolls, provided they fit within upper housing 109.

Flux housing thread 113 holds the flux housing 114 to the upper housing 109. Flux housing 114 holds the flux and is fitted to the upper housing 109.

Flux pushing rod 115 pushes the flux pumping piston. Flux pumping piston 116 pumps the flux through the hose 117. Flux feeding funnel 118 allows the flux to go into the pump by gravity force.

Figure 2:
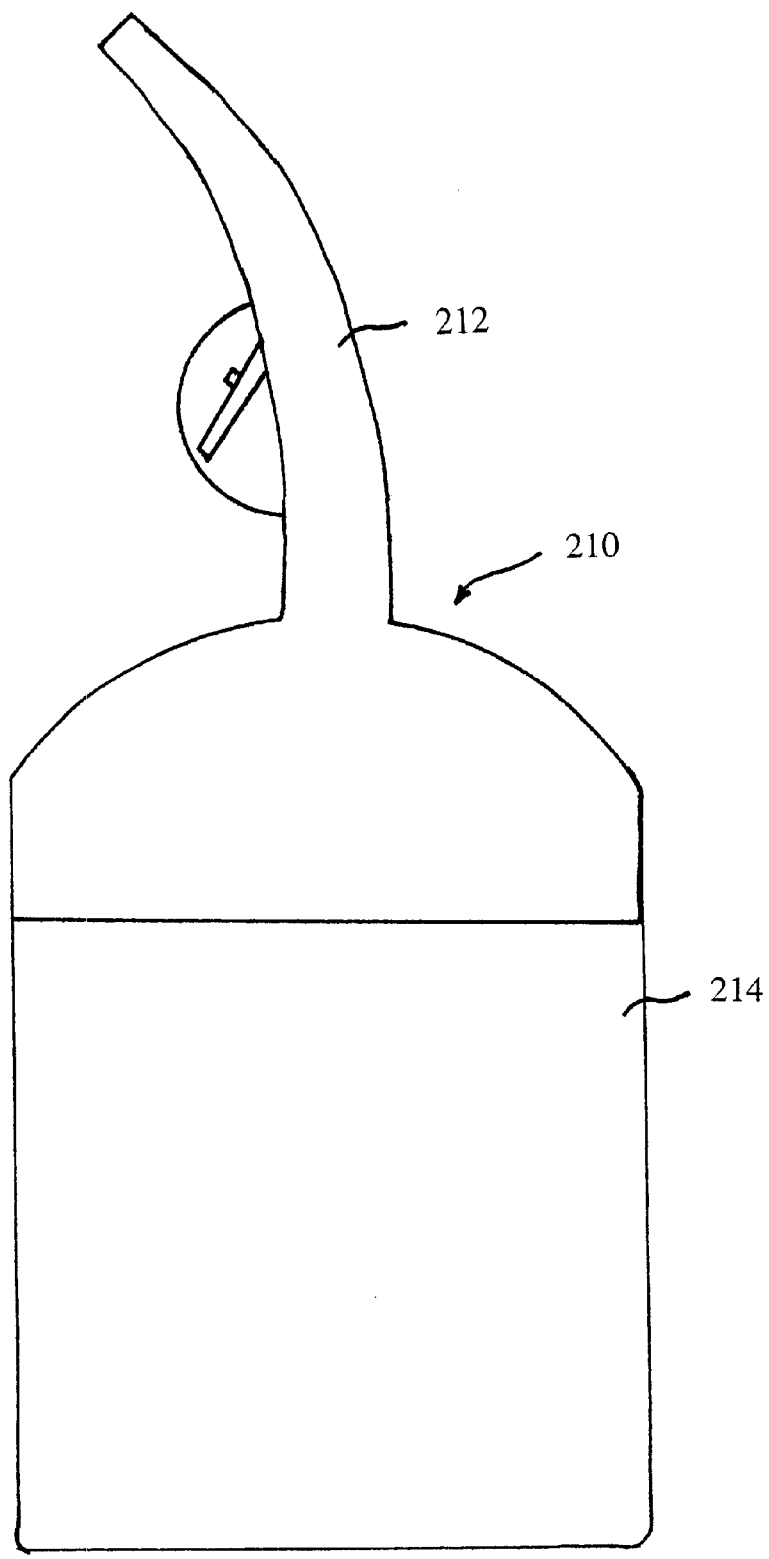
FIG. 2 is a side view of another preferred flux and solder tool.

Turning to FIG. 2, another preferred flux and solder feeding tool 210, is described. It includes an upper assembly 212 and a lower housing 214. The upper assembly 212 includes both the flux pump and the solder feed mechanisms. The lower housing 214 is used to store the liquid flux. The flux pump draws flux from the lower housing 214 by way of a tube that extends from the upper assembly 212 into the lower housing 214.

Figure 3:
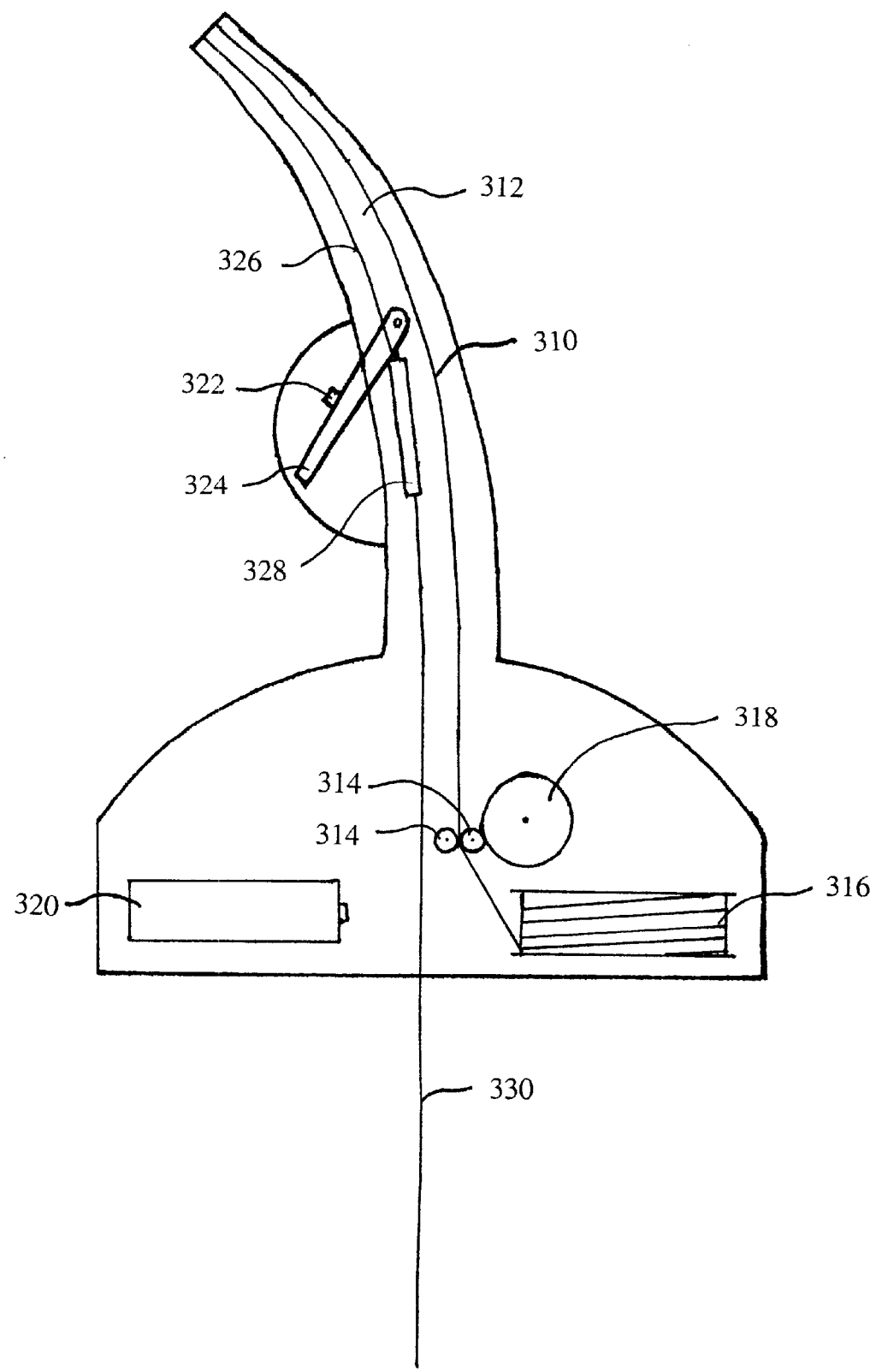
FIG. 3 is a side view of the upper assembly 212 of FIG. 2 showing interior components thereof.

Turning to FIG. 3, further details of the upper assembly 212 are described. It includes a solder tube 310 that extends from the exterior of nozzle 312 to gears 314. Another solder tube 316 feeds the solder from a roll 316 to the gears 314. Gears 314 engage the solder and when activated by motor 318 drive the solder from the roll 316 out through solder tube 310. Motor 318 is powered by an internal battery 320. To activate the motor, a user simply presses button 322 on trigger 324.

The upper nozzle assembly 212 also includes a flux tube 326 that extends from the exterior of nozzle 312 to pump mechanism 328. The pump mechanism 328 is attached to and activated by trigger 324. Tube 330 extends from the pump mechanism 328 into the lower housing 214 (shown in FIG. 2). When the pump mechanism 328 is activated, it draws flux from the lower housing 214 and pushes it out the top end of exterior nozzle 312.

Although the invention has been described with reference to specific embodiments, those skilled in the art will, of course, appreciate that many modifications are possible. For example, the pump mechanism taught by U.S. Pat. No. 5,492,275, which is incorporated herein by reference, could be substituted with only minor modifications for the pump mechanisms shown in the above embodiments. Likewise, the wire drive mechanism taught by U.S. Pat. No. 5,842,506, which is incorporated herein by reference, could be substituted with only minor modifications for the solder feed mechanisms shown in the above embodiments. Many other such modifications are possible without departing from the scope of the invention. All such embodiments and modifications are intended to fall within the scope of the following claims.

What is claimed is:

1. A flux and solder tool comprising:

a housing configured to store flux and solid wire solder;

a nozzle having a first interior channel configured to feed flux to a pipe and second interior channel configured to feed solid wire solder to the pipe;

a first pump coupled with the housing and the first interior channel and configured to feed flux from the housing to the first interior channel;

a second pump coupled with the housing and the second interior channel and configured to feed solid wire solder from the housing to the second interior channel; and a single trigger mechanically connected with the first pump and connected with the second pump so that operation of the single trigger in a first direction drives the first pump to deliver flux through the nozzle and so that operation of the single trigger in a second direction, opposite of the first direction, drives the second pump to deliver solid wire solder through the nozzle.

2. The flux and solder tool of claim 1, wherein the housing comprises a lower chamber for storing flux, and an upper chamber for storing the solid wire solder, wherein the lower chamber further comprises a gravity feed funnel that collects the flux, and wherein the upper chamber is removably attached to the lower chamber;

the first pump comprises a push rod that extends into the lower chamber and drives the flux into the first interior channel.

3. The flux and solder tool of claim 2, wherein the single trigger comprises a first end within the upper chamber that engages the first and second pumps and a second end that extends outside the upper chamber and wherein operation of the single trigger on the second end that extends outside the upper chamber drives both the first and second pumps.

4. A flux and solder tool comprising:

a housing configured to store flux and solid wire solder, wherein the housing comprises a lower chamber for storing flux, and an upper chamber for storing the solid wire solder, wherein the lower chamber further comprises a gravity feed funnel that collects the flux, and wherein the upper chamber is removably attached to the lower chamber;

a nozzle having a first interior channel configured to feed flux to a pipe and second interior channel configured to feed solid wire solder to the pipe;

a first pump coupled with the housing and the first interior channel and configured to feed flux from the housing to the first interior channel, wherein the first pump comprises a push rod that extends into the lower chamber and drives the flux into the first interior channel;

a second pump coupled with the housing and the second interior channel and configured to feed solid wire solder from the housing to the second interior channel, wherein the second pump comprises a pinion and a pair of pins positioned so that the solid wire solder passes between the pinion on one side and the pair of pins on an opposite side and so that rotation of the pinion drives the solid wire solder into the second interior channel; and a trigger mechanically connected with the first pump and connected with the second pump wherein a pivot point along the trigger is positioned within the upper chamber and wherein the trigger engages the pinion on one side of the pivot point and wherein the trigger engages the push rod on an opposite side of the pivot point.

* * * * *